(12) United States Patent
Halbweiss et al.

(10) Patent No.: US 6,623,065 B2
(45) Date of Patent: Sep. 23, 2003

(54) CONVERTIBLE VEHICLE FOLDING ROOF MOVABLE BETWEEN A CLOSED AND A STORAGE POSITION

(75) Inventors: Thomas Halbweiss, Remseck (DE); Wojciech Wezyk, Sindelfingen (DE)

(73) Assignee: CTS Fahrzeugdachsysteme GmbH g-dach, Hamburg (DE)

( * ) Notice: Subject to any disclaimer, the term of this patent is extended or adjusted under 35 U.S.C. 154(b) by 0 days.

(21) Appl. No.: 10/131,799

(22) Filed: Apr. 19, 2002

(65) Prior Publication Data
US 2003/0052509 A1 Mar. 20, 2003

Related U.S. Application Data

(63) Continuation-in-part of application No. PCT/EP01/09674, filed on Aug. 22, 2001.

(30) Foreign Application Priority Data

Aug. 30, 2000 (DE) .......................................... 100 42 417

(51) Int. Cl.[7] .................................................. B60J 7/12
(52) U.S. Cl. .............. 296/122; 296/107.09; 296/107.16
(58) Field of Search ........................... 296/107.01, 109, 296/116, 118, 107.09, 107.11, 107.16, 121, 122

(56) References Cited

U.S. PATENT DOCUMENTS

| | | | |
|---|---|---|---|
| 2,434,711 A | * | 1/1948 | Mobbs et al. ............... 296/222 |
| 3,159,422 A | | 12/1964 | Lautenbach |
| 3,473,842 A | | 10/1969 | Bracey et al. |
| 6,267,433 B1 | * | 7/2001 | Bayer et al. ................. 296/121 |
| 6,412,860 B1 | * | 7/2002 | Reinsch ....................... 296/219 |

FOREIGN PATENT DOCUMENTS

| | | | | |
|---|---|---|---|---|
| DE | 943 747 | | 6/1956 | |
| DE | 3721895 A1 | * | 1/1989 | ........... B62D/31/00 |
| DE | 198 52 615 | | 12/1999 | |
| DE | 199 11 541 | | 5/2000 | |
| FR | 0058871 A | * | 11/1949 | .................. 296/118 |
| FR | 2630053 A | * | 10/1989 | ............ B60J/07/08 |
| GB | 0496589 A | * | 12/1938 | ............ 296/107.09 |

* cited by examiner

Primary Examiner—D. Glenn Dayoan
Assistant Examiner—Patricia Engle
(74) Attorney, Agent, or Firm—Klaus J. Bach

(57) ABSTRACT

In a folding convertible roof for a vehicle which roof is movable between a closed position, in which it covers the interior of the vehicle, and an storage position, in which it is folded into a storage compartment behind the vehicle interior the folding roof includes a roof support structure with a roof material and side support elements extending at opposite sides of the roof and being mounted each on a pivot member which is pivotably and tiltably supported and coupled to the actuating element capable of pivoting and tilting the pivot member while opening or closing said roof for transferring the side support element between the closed position, in which it extends longitudinally along a side of the roof and a transverse storage position.

7 Claims, 4 Drawing Sheets

CONVERTIBLE VEHICLE FOLDING ROOF MOVABLE BETWEEN A CLOSED AND A STORAGE POSITION

This is a Continuation-In-Part application of international application PCT/EP01/09674 filed Aug. 22, 2001 and claiming the priority of German application No. 100 42 417.1 filed Aug. 30, 2000.

BACKGROUND OF THE INVENTION

The invention relates to a convertible vehicle folding roof, which is movable between a closed position, in which it covers the vehicle interior and a storage position, in which it is deposited in a storage compartment. The folding roof includes a support structure which comprises rods interconnected by a linkage and pivotally supported about a pivot joint on the vehicle body and operable by an operating element.

Such a folding convertible roof is disclosed for example in DE 943 747. The folding roof comprises a plurality of support rods which are kinematically interconnected and a roof material, which covers the interior vehicle space when the roof is closed and which is deposited, together with the roof support rods in a storage compartment behind the vehicle interior space when the roof is opened.

The roof includes side frame members, which extend in the longitudinal vehicle direction when the roof is closed and which engage side windows of the vehicle. In order to provide for a relatively small storage space the side frame members are pivotable by way of a joint arrangement, which comprises a first vehicle side pivot joint and a second pivot joint which is a relative joint disposed on top of the first joint so that, upon movement between the open and closed positions of the roof cover the side frame member is rotated about two axes opposite to the longitudinal direction as well as in the direction toward the vehicle interior. The pivot movements about the axis of the pivot joint, which is connected to the vehicle, and about the relative joint are mechanically coupled by bevel gears.

For the movement of the folding roof between its closed and storage positions an actuator is provided which engages a pivot joint of the roof operating linkage by way of a lever. The pivot joint movement is transmitted to the bevel gears. However, a force transfer by way of the bevel gears requires a very high operating force because of the disadvantageous lever ratio so that a relatively strong and heavy operating mechanism is required. Also, the play present in the joints and the linkages resulting from wear results in a relatively inaccurate, not well defined movement of the folding roof.

It is the object of the present invention to provide for a convertible vehicle a folding roof which requires only a relatively small storage space and which is easily and reliably movable between the closed and storage positions.

SUMMARY OF THE INVENTION

In a folding convertible roof for a vehicle which roof is movable between a closed position in which it covers the interior of the vehicle and an storage position in which it is folded into a storage compartment behind the vehicle interior, the folding roof includes a roof support structure with a roof material and side support elements extending at opposite sides of the roof and being mounted each on a pivot member, which is pivotably and tiltably supported and coupled to an actuating element capable of pivoting and tilting the pivot member while opening or closing the roof for transferring the side support elements between the closed and the storage positions.

The coupling point between the actuating element and the relative joint is disposed at a distance from the pivot axis of the relative joint and also from the pivot axis of the vehicle-side pivot joint of the side frame member. Because of the distance from the respective pivot axes, a relatively small force is required for moving the vehicle roof between the closed and the open positions about the pivot axis of the relative joint and also about the pivot axis of the vehicle-side tilt joint so that only a lightweight actuating element is required.

For moving the folding roof between the closed and the storage positions a rotation of the actuating element about a single axis of rotation is sufficient. This rotation may be provided for example by a linear drive. The rotation of the actuating element with only one degree of freedom is converted to a spatial pivot movement of the side support member about two axes by a coupling with the pivot joint arrangement of the side frame member including a pivot joint and a tilt joint. By way of the coupling of the side support member with additional support bars of the vehicle roof support frame and with the vehicle roof material, a transfer of the whole folding roof is possible with only a single actuating element at each side of the vehicle roof.

The actuating element is rotatably connected to the relative pivot joint wherein the axis of rotation at the coupling point between the actuating element and the relative pivot joint extends preferably at an angle with respect to the axis of rotation of the relative pivot joint which angle is smaller than 60°. Under certain conditions the axes may extend parallel to each other. In this embodiment, the actuating element and the end section of the side support member adjacent the pivot joint arrangement may extend approximately parallel to each other or at a small angle relative to each other to provide for a space saving arrangement.

Preferably, the bearing for the actuating element as well as the pivot bearing of the side support member are supported by a common support block mounted to the vehicle body wherein the bearing for the actuating element is arranged at the outer side of the bearing block remote from the vehicle interior, in order to avoid any obstruction to the movement of the side support member during the transfer of the roof between the closed and the open positions. At the same time, a compact design is achieved since the bearing of the actuating element and the tilt bearing of the side support member utlize a common support block.

The actuating element is preferably provided with an actuating drive which is arranged in the vehicle about horizontally and is for example in the form of a hydraulic drive or, if appropriate a pneumatic or electric drive. The drive applies a driving force to one leg of the actuating element whereby movement of the actuating element and, together therewith, of the whole roof operating mechanism is initiated. In the storage position of the vehicle roof, the drive and the actuating element are disposed about parallel to each other so that only a small storage space is required. In the closed position of the roof, the axes of the drive and the actuating element extend preferably at an angle of about 90°, whereby an optimal lever arrangement for generating a pivot torque for moving the vehicle roof from the closed to the storage position is provided.

The coupling point between the actuating element and the relative joint is expediently disposed at the side of the linkage arrangement facing the vehicle interior space so that no constriction features which affect the vehicle body panels are required for the integration of the actuating element.

The invention will become more readily apparent from the following description thereof on the basis of the accompanying drawings.

DESCRIPTION OF A PREFERRED EMBODIMENT

Figure 1:
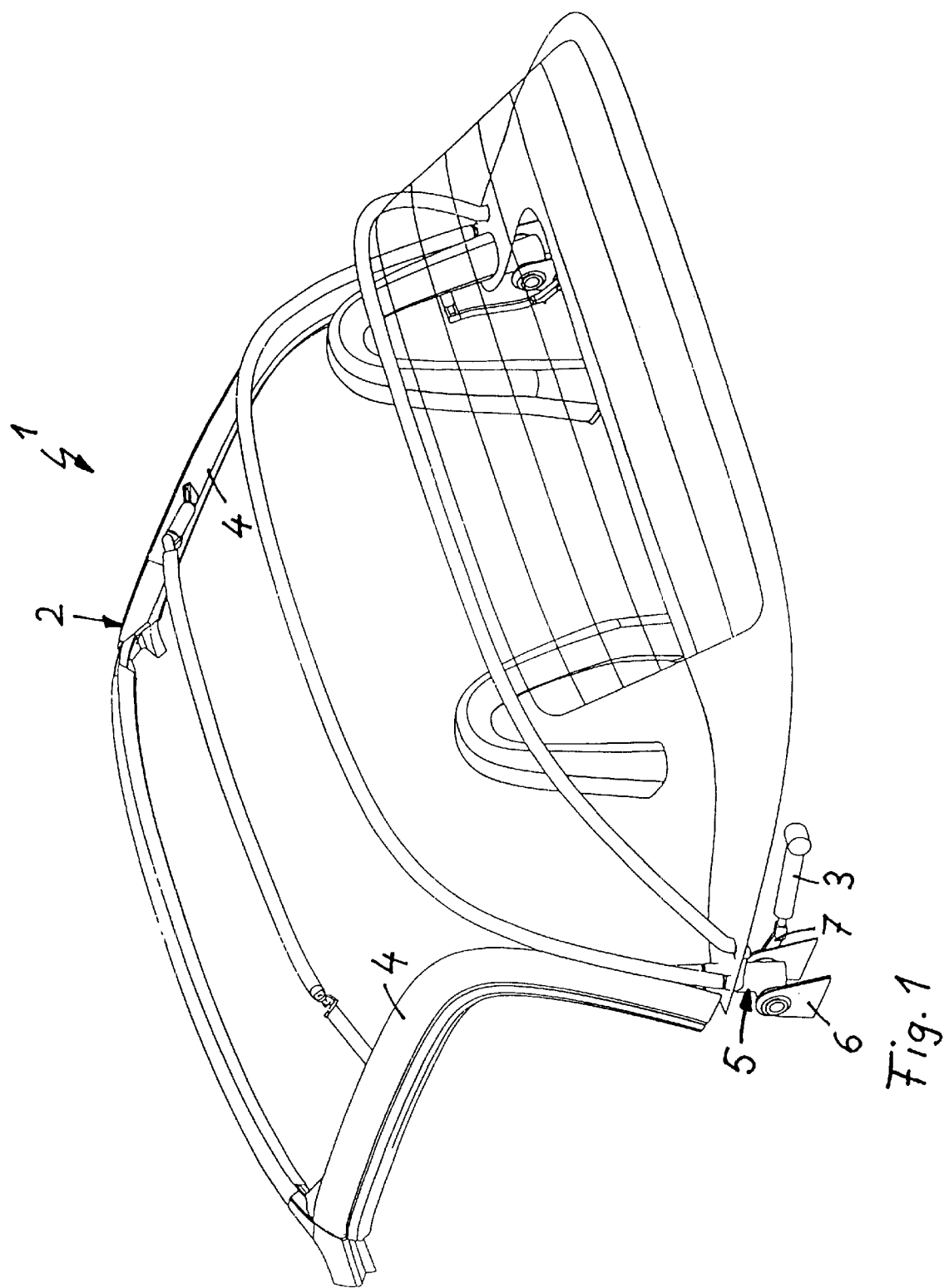
FIG. 1 is a perspective view of a convertible vehicle roof whose side support elements are received/mounted in a pivot joint arrangement and execute a spatial pivot movement between the closed and the storage positions of the roof.

In the various figures, identical components are designated by the same reference numerals.

The vehicle roof 1 is movable between the closed position as shown in FIG. 1, wherein the interior vehicle space is covered and a storage position, in which the vehicle roof is deposited in a storage compartment behind the interior vehicle space. The vehicle roof 1 is in the form of a soft-top and comprises a roof support structure 2 and roof material supported by the roof support structure 2. The roof support structure 2 comprises a plurality of a kinematically interconnected support elements which, in the closed position of the roof, extend in the longitudinal and, respectively, transverse vehicle direction and which are supported movably relative to each other and relative to the vehicle body by joint structures. The roof support structure 2 together with the roof material is movable automatically by means of an actuation drive 3 between the closed and the storage positions.

The roof support structure 2 includes side support elements 4, which, in the closed position of the vehicle roof, extend in the longitudinal direction along the side windows of the vehicle. The side support elements 4 are each supported by a pivot joint arrangement 5 arranged on a support block 6, which is mounted on the vehicle body. Also, an actuating element 7, which is operated by the actuation drive 3 and which transmits an actuation movement to the side support element 4, is supported on the support block 6.

Figure 2:
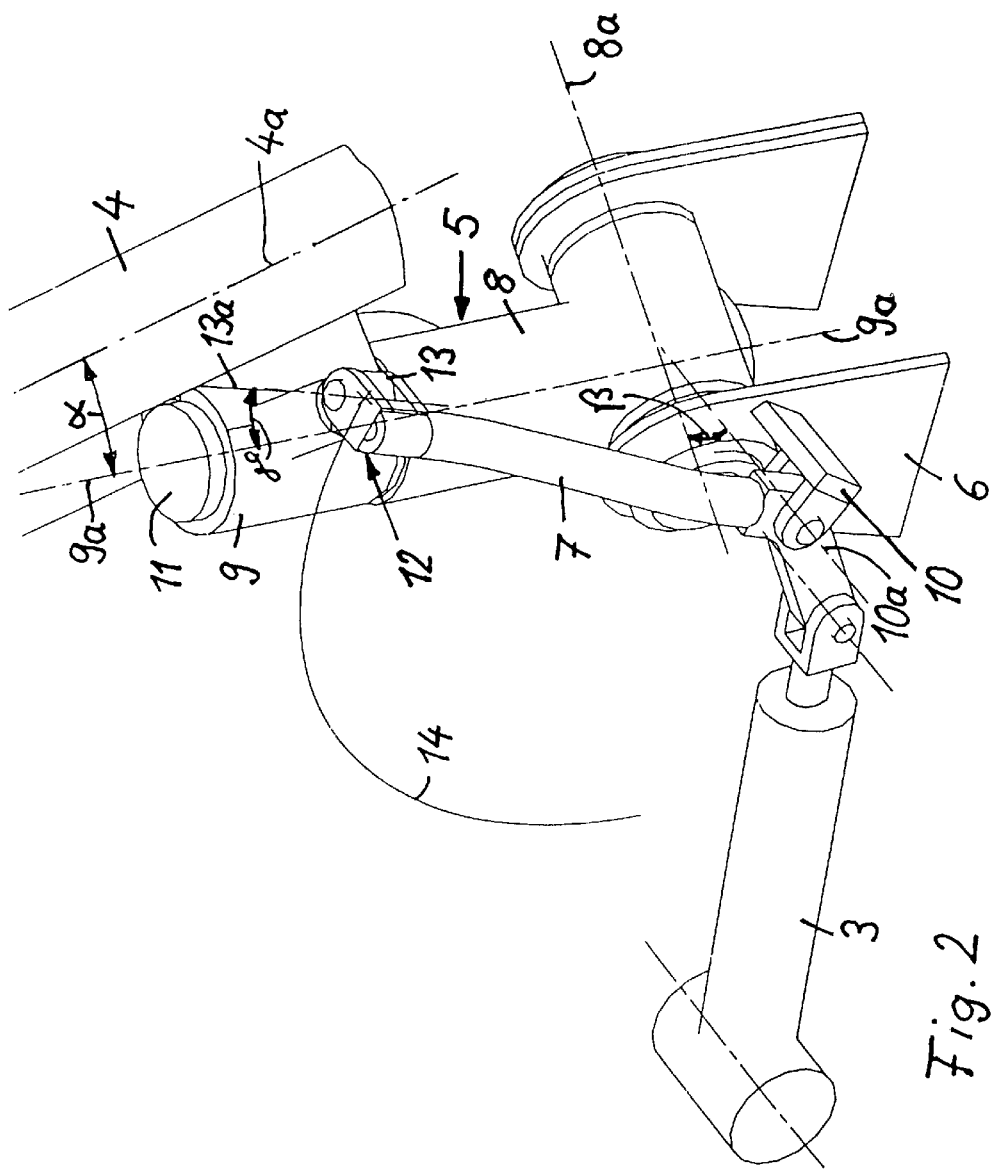
FIG. 2 shows, in an enlarged view, the pivot joint arrangement for the side support elements including an actuating element and an actuating element drive for operating the side support elements.

As shown in FIG. 2, the pivot joint arrangement 5 supporting the side support element 4 consists of a tilt joint member 8 supported on the vehicle body and a relative pivot joint 9, which is supported on the tilt joint member 8 so as to be pivotable relative thereto. The side support element 4 is mounted to the relative pivot joint 9 so as to be pivotable thereon and tiltable therewith. The vehicle-side tilt joint member 8 is tiltably supported on the support block 6 of the vehicle.

The pivot axis 9a of the relative pivot joint 9, which is rotatably supported on the tilt joint member 8, extends normal to the tilt axis 8a of the tilt joint member 8. The side support element 4 may perform a spatial pivot movement by concurrent movement about the tilt axis 8a of the tilt joint member 8 and about the pivot axis 9a of the relative pivot joint 9.

The relative pivot joint 9 includes a rotatable sleeve, which is disposed on a joint pin 11 of the tilt joint member 8. The axial end section of the side support element 4 is firmly connected to the sleeve of the relative joint 9. The side support element axis 4a defines, with the pivot axis 9a of the relative joint 9 at the end section of the side support element 4, an angle α of less than 45°, preferably approximately 30°.

The pivot movements about the pivot axis 8a of the tilt member 8 and the pivot axis 9a of the relative pivot joint 9 during the transfer movement of the vehicle roof between the closed and the storage positions are coupled kinematically by way of the actuating element 7, which is also supported rotatably on the support block 6 by a bearing structure 10. The pivot axis 10a of the bearing structure 10 for the actuating element 7 defines with the tilt axis 8a of the tilt joint member 8 supporting the side support element 4 an angle β of less than 45°, preferably about 30°.

The actuating element 7 includes a lower portion, which extends beyond the bearing structure 10 and which is engaged by the actuation drive 3, that is disposed in about a horizontal orientation. The actuation drive 3 is a linear drive which, when actuating the actuating element 7, pivots the actuating element 7 about the axis 10a of its bearing structure 10. At its end remote from the actuation drive 3, the actuating element 7 is connected to the relative pivot joint 9. In the coupling point 12 between the actuating element 7 and the relative pivot joint 9, there is another actuating pivot joint 13, by way of which a relative rotation of the actuating element 7 with resect to the relative pivot joint 9 about the pivot axis 13a is made possible. The angle γ between the pivot axis 13a and the pivot axis 9a of the relatively pivot joint 9 is smaller than 45°. Preferably the angle γ is about 20°. The pivot axis 13a of the actuation pivot joint 13 extends about parallel to the longitudinal axis of the actuating element 7.

The actuating element 7 is connected only to the relative pivot joint 9, not to the tilt joint member 8. Because of the spatial arrangement of the actuating element 7 and the joints of the pivot joint arrangement 5, upon actuation of the actuating element 7 by the actuation drive 3 and a circular movement of the coupling point 12 along the circular path 14 caused thereby, on one hand, the side support element 4 will rotate about the relative pivot axis 9a of the relative pivot joint 9 and, on the other hand, it will pivot about the tilt axis 8a of the vehicle-side tilt joint member 8. With the actuating element 7, the pivot movements of the relative pivot joint 9 and the tilting of the tilt joint member 8 are kinematically coupled. When being actuated by the actuation drive 3 and the actuation element 7, the side support element 4 will therefore follow a spatial pivot path about both the tilt axis 8a and the relative pivot axis 9a.

The coupling joint 12 between the actuating element 7 and the relative pivot joint 9 is disposed at a certain distance from the pivot axis 9a of the relative pivot joint 9 and also at a certain distance from the pivot axis 8a of the tilt member 8. With a pivot movement of the actuating element 7 initiated by an actuation from the actuation drive 3, a pivot movement about the pivot axis 8a and also a pivot moment about the pivot axis 9a is generated: Since the pivot axis 10a extends at an angle β with respect to the tilt axis 8a as shown in FIG. 2, the end of the actuating element moves with its coupling point 12 away from the relative pivot joint 9, so that, while tilting the tilt joint member 8, it pivots also the relative pivot joint 9.

Figure 3:
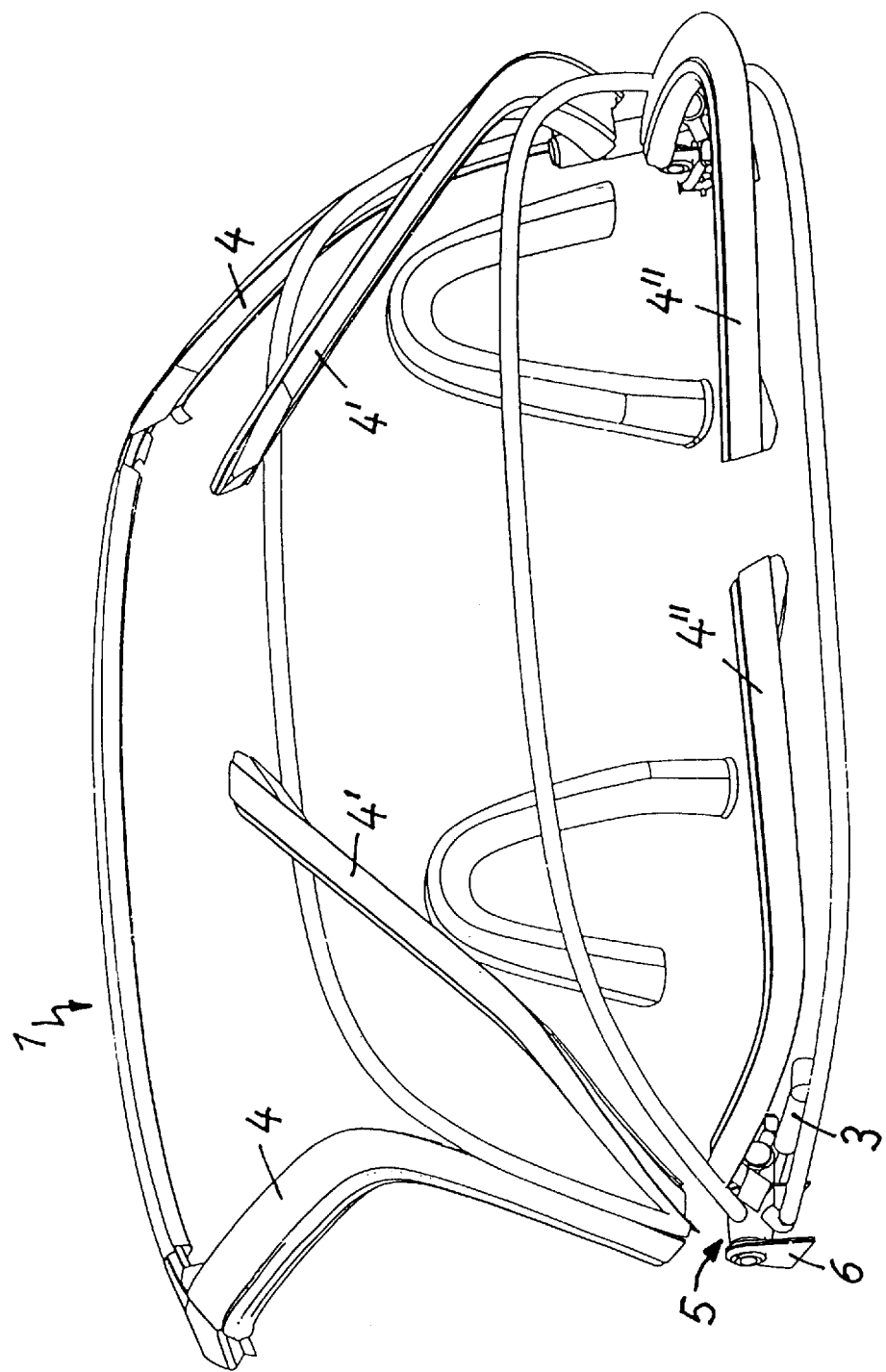
FIG. 3 is a perspective view of a vehicle roof in a slightly modifies embodiment showing the side support elements in the closed position, in an intermediate position and in the storage position.

FIG. 3 shows the side support elements 4 with the vehicle roof 1 in a closed position, in an intermediate position between the closed and the storage positions (indicated by 4') and in a storage position (indicated by 4"). In the storage position of the roof, the side support element 4 which includes two sections which extend at a 90° angle relative to each other and partially surround a side window, are pivoted toward the rear and also inwardly toward the vehicle interior. They are finally deposited in the storage compartment behind the vehicle interior. This double tilt and pivot movement is achieved by a combined pivoting about both joints of the pivot joint arrangement 5.

Figure 4:
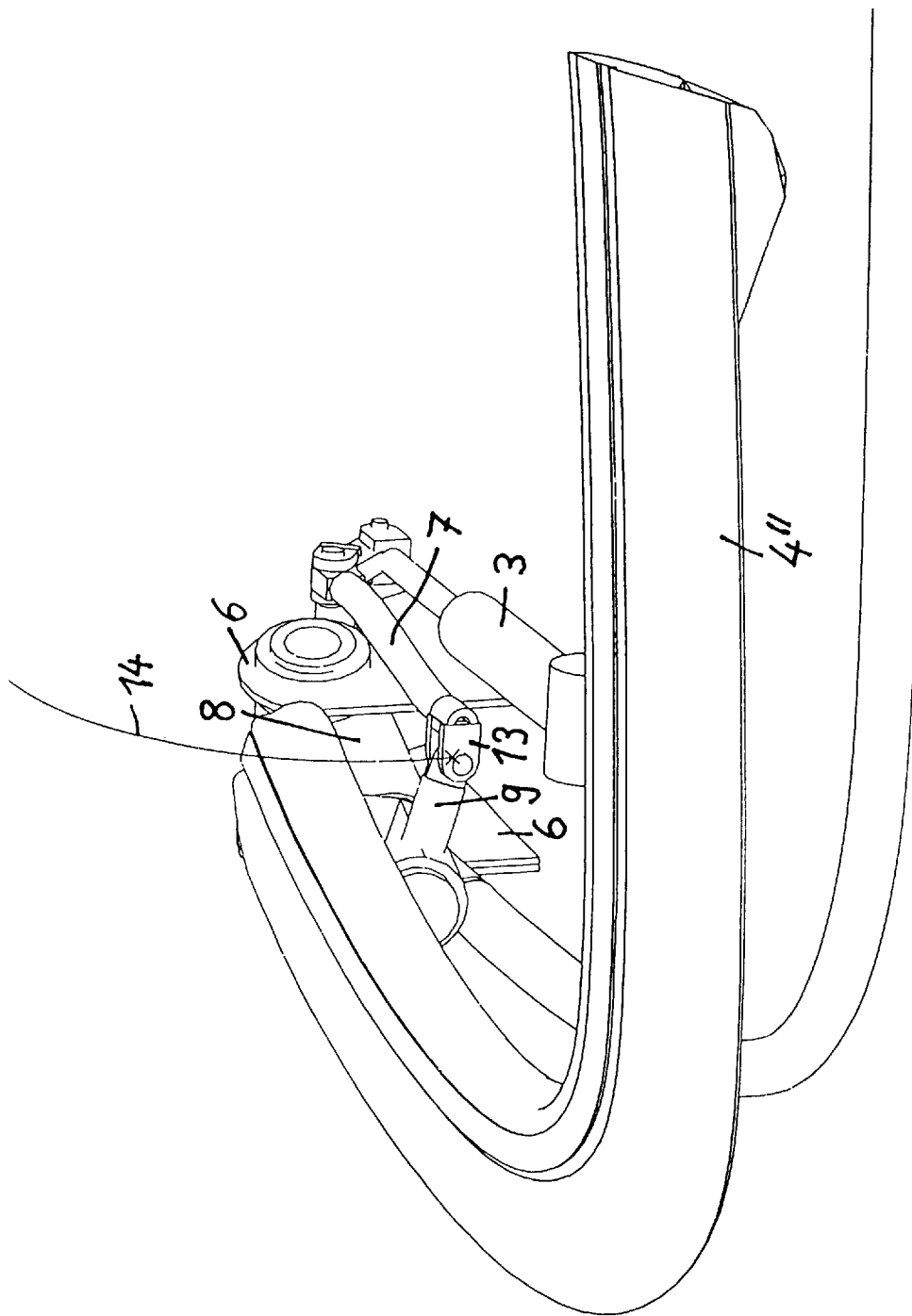
FIG. 4 is a sectional view of the vehicle roof in a storage position.

As apparent from FIG. 4, the actuating element 7, the tilt joint 8 and the side support element 4" are disposed essentially in parallel with each other. This arrangement provides for a small storage volume.

What is claimed is:

1. A folding convertible roof for a vehicle, which roof is movable between a closed position, in which it covers the interior space of a vehicle, and a storage position, in which the roof is deposited in a storage compartment behind an interior space of the vehicle, said folding roof comprising a roof support structure with a roof material connected to said roof support structure and a side support element disposed at each side of said roof, each side support element being supported by a pivot joint arrangement mounted on said vehicle such that said side support element is pivotable about a tilt axis and a relative pivot axis which extend at a right angle with respect to each other and which are kinematically coupled at a coupling point so that the pivot movements of said side support element are coordinated, when said support element is actuated by an actuating element, said actuating element being pivotable about a pivot axis extending at an angle to said tilt axis and having an end disposed at a certain distance from said relative pivot axis and actuating said side support element for pivoting said side support element about said relative pivot axis and, at the same time, tilting said side support element about said tilt axis.

2. A folding convertible roof according to claim 1, wherein said pivot axis of said actuating element extends at an angle to said tilt axis of said tilt member of less than 45°.

3. A folding convertible roof according to claim 1, wherein the pivot axis at which said actuating element is connected to the relative pivot member at said coupling point forms with the pivot axis of said pivot member an angle of about 30°.

4. A folding convertible according to claim 1, wherein said actuating element is pivotally supported on a bearing support structure and said bearing support structure and said tilt joint member are mounted on a common support block.

5. A folding convertible according to claim 1, wherein an actuator drive is provided for actuating said actuating element, said actuator drive being disposed in said vehicle in a horizontal orientation.

6. A folding convertible according to claim 5, wherein said actuator drive and said actuator element are disposed in parallel relationship, when said roof is deposited in the storage compartment.

7. A folding convertible according to claim 4, wherein said coupling point of said actuating element is disposed at the inside of said support block facing the vehicle interior.

\* \* \* \* \*